US010294344B2

(12) United States Patent
Verschuere

(10) Patent No.: US 10,294,344 B2
(45) Date of Patent: May 21, 2019

(54) FLUOROELASTOMER COMPONENT FOR CONTACTING AMMONIA AND/OR UREA

(71) Applicant: 3M INNOVATIVE PROPERTIES COMPANY, St. Paul, MN (US)

(72) Inventor: Alain Verschuere, Melsele (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/036,823

(22) PCT Filed: Dec. 8, 2014

(86) PCT No.: PCT/US2014/068997
§ 371 (c)(1),
(2) Date: May 16, 2016

(87) PCT Pub. No.: WO2015/088940
PCT Pub. Date: Jun. 18, 2015

(65) Prior Publication Data
US 2016/0289414 A1   Oct. 6, 2016

Related U.S. Application Data

(60) Provisional application No. 61/913,449, filed on Dec. 9, 2013.

(51) Int. Cl.
C08K 3/22    (2006.01)
C08K 5/14    (2006.01)

(52) U.S. Cl.
CPC ............... C08K 3/22 (2013.01); C08K 5/14 (2013.01); C08K 2003/2217 (2013.01); C08K 2003/2227 (2013.01)

(58) Field of Classification Search
CPC .... C08K 3/22; C08K 5/14; C08K 2003/2217; C08K 2003/2227
See application file for complete search history.

(56) References Cited

U.S. PATENT DOCUMENTS

| | | |
|---|---|---|
| 4,000,356 A | 12/1976 | Weisgerber |
| 4,214,060 A | 7/1980 | Apotheker |
| 4,243,770 A | 1/1981 | Tatemoto |
| 4,501,869 A | 2/1985 | Tatemoto |
| 4,745,165 A | 5/1988 | Arcella |
| 4,831,085 A | 5/1989 | Okabe |
| 5,231,154 A | 7/1993 | Hung |
| 5,461,107 A | 10/1995 | Amin et al. |
| 5,910,552 A | 6/1999 | Saito |
| 5,958,532 A | 9/1999 | Krause |
| 7,431,991 B2 | 10/2008 | Verschuere |
| 2002/0081239 A1* | 6/2002 | Palesch ............ B01D 53/90 422/168 |
| 2005/0147828 A1* | 7/2005 | Verschuere ............ B32B 1/08 428/422 |
| 2008/0110081 A1* | 5/2008 | Rae ............ C10L 1/10 44/308 |
| 2008/0116603 A1 | 5/2008 | Grootaert |
| 2008/0314033 A1* | 12/2008 | Aneja ............ F01N 3/033 60/297 |
| 2010/0072207 A1* | 3/2010 | Inaba ............ B32B 27/08 220/495.06 |
| 2010/0288249 A1* | 11/2010 | Sasaki ............ F02B 43/00 123/575 |
| 2011/0152487 A1 | 6/2011 | Cook |
| 2011/0269911 A1* | 11/2011 | Morita ............ C08F 214/22 525/326.2 |
| 2011/0287202 A1 | 11/2011 | Ichisaka |
| 2013/0230675 A1 | 9/2013 | Masui |

FOREIGN PATENT DOCUMENTS

| | | |
|---|---|---|
| EP | 0101930 | 3/1984 |
| EP | 0407937 | 1/1991 |
| EP | 0661304 | 7/1995 |
| EP | 0769521 | 4/1997 |
| EP | 0784064 | 7/1997 |
| EP | 1585786 | 10/2005 |
| EP | 2 019 127 | 1/2009 |
| JP | H08-512355 | 12/1996 |
| JP | 2005-132939 | 5/2005 |
| JP | 2012-251095 | 12/2012 |
| WO | WO 95/02633 | 1/1995 |
| WO | WO 2007/135937 | 11/2007 |

OTHER PUBLICATIONS

Graco Chemical Compatibility Guide, 2013, p. 1-51.*
Stockwell Elastomerics; Compression Set of Elastomeric Materials, 2011, p. 1 [Accessed via the Internet on Mar. 21, 2018] URL: <https://web.archive.org/web/20131201153110/https://www.stockwell.com/compression-set-testing.php>.*
International Search Report for PCT International Application No. PCT/US2014/068997, dated Mar. 19, 2015, 3pgs.
Zhang, et al., "Chemicals Suitable for Contact: Amine, Ammonia," in Tables 3-8, Fluorinated Functional Materials, Chapter 3, Fluroelastomer, p. 224, Chemical Industry Press, Feb. 2008.

* cited by examiner

Primary Examiner — Robert S Jones
(74) Attorney, Agent, or Firm — Julie Lapos-Kuchar

(57) ABSTRACT

Described herein is a component for contacting ammonia and/or urea having a surface that in use will come into contact with urea and/or ammonia. The component comprises fluoroelastomer composition comprising fluoropolymer and a hydrotalcite compound.

20 Claims, No Drawings

FLUOROELASTOMER COMPONENT FOR CONTACTING AMMONIA AND/OR UREA

CROSS REFERENCE TO RELATED APPLICATIONS

This application is a national stage filing under 35 U.S.C. 371 of PCT/US2014/068997, filed Dec. 8, 2014, which claims the benefit of U.S. Application No. 61/913,449, filed Dec. 9, 2013, the disclosure of which is incorporated by reference in its/their entirety herein.

TECHNICAL FIELD

The present disclosure relates to a component for contacting ammonia and/or urea wherein the component comprises a fluoroelastomer and a hydrotalcite compound. In particular, the present disclosure relates to the use of a hydrotalcite compound to improve the resistance of the fluoroelastomer composition when brought in contact with urea and/or ammonia, more in particular with ammonia at elevated temperatures.

SUMMARY

There is a desire for identifying fluoroelastomeric compositions that have resistance when brought in contact with urea and/or ammonia.

In one embodiment, a component for contacting ammonia and/or urea having a surface that is in contact with at least one of urea and ammonia, the surface comprising a fluoroelastomer composition comprising a fluoropolymer and a hydrotalcite compound is provided.

In another embodiment, a method is provided comprising utilizing a hydrotalcite compound in a fluoroelastomer composition of a component for contacting ammonia and/or urea to prevent or reduce swelling of the fluoroelastomer composition when the fluoroelastomer composition is contacted with at least one of urea and ammonia.

In yet another embodiment, a use of a hydrotalcite compound in a fluoroelastomer composition of a component for contacting ammonia and/or urea to prevent or reduce swelling of the fluoroelastomer composition when the fluoroelastomer composition is contacted with at least one of urea and ammonia is provided.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Since the early 1990's, the European Union issued a series of emission standards that increasingly have become more stringent on the allowed emissions of new vehicles. One particular emission of interest is $NO_x$, a known pollutant, which is generated as an exhaust gas under certain conditions (such as high combustion temperatures and pressures). One method of reducing $NO_x$ emissions is to treat the exhaust gas. $NO_x$ in the exhaust gas can be reacted with ammonia and oxygen to form $N_2$ and water, which are then released in the exhaust.

The trade name "ADBLUE" is an aqueous urea solution, comprising 32.5% urea, used to lower $NO_x$ concentrations in the exhaust emissions from diesel engines. Urea decomposes to form ammonia and $CO_2$. The ammonia is then able to react with the $NO_x$ in a selective catalytic reduction (SCR) to lower the $NO_x$ concentration in the exhaust gas. In these systems, the ADBLUE is injected into the raw exhaust in front of the SCR.

Traditionally, materials such as EPDM (ethylene propylene rubber) and HNBR (hydrogenated nitrile rubber) have been used to house and transport ADBLUE, however, the urea may disintegrate especially at higher temperatures (e.g. >100° C.), generating ammonia, which chemically attacks the EPDM and HNBR. Perfluorinated elastomers with special formulations may provide chemical resistance to ADBLUE at high temperatures, however, these materials are typically expensive and in some instances, they may lack adequate properties in cold temperatures.

In the present disclosure, it has been discovered that a fluoroelastomer composition comprising a partially fluorinated elastomeric polymer and a hydrotalcite can achieve improved swell resistance to ammonia under elevated temperature conditions.

The present disclosure is directed towards a component for contacting (e.g., housing, reacting, and/or transporting) ammonia and/or urea. As used herein, "component for contacting ammonia and/or urea" refers to any component (e.g., vessel, hose, seal, gasket, etc.) that may come in contact with urea and/or ammonia during standard use. Such components may be found for example in automotive exhaust systems and in industrial manufacturing processes utilizing ammonia or urea (e.g., reaction vessels).

By the term "component for contacting ammonia and/or urea" is meant the total of components as used in storing, supplying, transporting, reacting, metering, and control of urea and/or ammonia; and that are exposed to or come in contact with urea and/or ammonia. Without limitation, such components include molded and/or extruded goods, for example, storage components such as tanks, hoses, and tank cap seals; supply components such as hoses or tubings; valves; diaphragms; injector components; reaction components (e.g., SCR); reaction vessels (i.e., vessels were reactions occur); shaft seals; and connector components such as O-rings.

As disclosed herein, "ammonia" refers to both the liquid and gas forms of ammonia ($NH_3$) including, for example, $NH_4OH$, and ammonium alkoxide (e.g., ammonium methoxide).

As disclosed herein, "urea" refers to a urea or a polyurea.

As will be shown below, the fluoroelastomer compositions of the present disclosure comprising a fluoroelastomer and a hydrotalcite compound have been found to have resistance to swell in ammonia and urea making them particularly well suited for applications requiring lower cost elastomers having resistance to ammonia and/or urea, particularly resistance to ammonia at elevated temperatures.

The hydrotalcite compound used in the present disclosure may comprise a natural or synthetic hydrotalcite compound or mixture thereof. Particularly suitable hydrotalcite compounds are Mg and/or Al hydrocarbonate minerals of synthetic or natural origin. Examples of natural compounds include Hydrotalcite $Mg_6Al_2(OH)_{16}CO_3.4H_2O$) and members of the hydrotalcite group, such as; Stichtite $Mg_6Cr_2(OH)_{16}CO_3.4H_2O$; Pyroaurite $Mg_6Fe(III)_2(OH)_{16}CO_3.4H_2O$; Desautelsite $Mg_6Mn(III)_2(OH)_{16}CO_3.4H_2O$ and the like.

The hydrotalcite compound may also be a synthetic hydrotalcite compound. Examples of synthetic hydrotalcite compounds include: $Mg_6Al_2(OH)_{16}CO_3.4H_2O$, $Mg_{4.5}Al_2(OH)_{13}CO_3.3.5H_2O$, $Mg_{4.5}Al_2(OH)_{13}CO_3$, $Mg_4Al_2(OH)_{12}CO_3.3.5H_2O$, $Mg_5Al_2(OH)_{14}CO_3.4H_2O$, $Mg_3Al_2(OH)_{10}CO_3.1.7H_2O$, $Mg_3ZnAl_2(OH)_{12}CO_3.wH_2O$ and $Mg_3ZnAl_2(OH)_{12}CO_3$. Synthetic hydrotalcites that are commercially available, include for example those available from Kisuma Chemicals BV, Veendam, Netherlands, under the trade designations "DHT-4A", "DHT-4V", and "ZHT-4A"; and "HYCITE 713", which is available from Ciba Specialties Chemicals, Basel, Switzerland.

Hydrotalcite compounds that can be used in connection with the present disclosure include in particular those that can be represented by the formula:

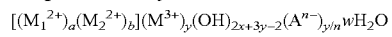

wherein $M_1^{2+}$ represents at least one divalent metal selected from the group consisting of $Mg^{2+}$, $Ca^{2+}$, $Sr^{2+}$ and $Ba^{2+}$; $M2^{2+}$ represents at least one divalent metal selected from the group consisting of $Zn^{2+}$, $Cd^{2-}$, $Pb^{2+}$ and $Sn^{2+}$; $M^{3+}$ represents a trivalent metal ion; $A^{n-}$ represents an n-valent anion, such as $F^-$, $Cl^-$, $Br^-$, $NO_3^-$, $CO_3^{2-}$, $SO_4^{2-}$, $Fe(CN)_6^{4-}$, $CH_3COO^-$, an oxalic acid ion, or a salicylic acid ion; a and b respectively represent a value from 0 to 10, x represents a+b and has a value from 1 to 10, y represents an integer from 1 to 5, and w represents a real number.

In one embodiment, the hydrotalcite compound is dispersed within the fluoroelastomer composition.

The hydrotalcite compound is typically used in the fluoroelastomer composition in an amount between 0.1 and 20% by weight relative to the amount of fluoropolymer; at least 0.3, 0.5, 0.7, 1, 2, or even 4% by weight and at most 10, 15, or even 20% by weight.

In the present disclosure, the fluoroelastomer composition comprises a fluoropolymer having a partially fluorinated backbone, meaning that the carbons on the fluoropolymer backbone comprise both hydrogen and fluorine atoms. In some embodiments, other atoms are present along the fluoropolymer backbone including, e.g., chloride or oxygen atoms. Particularly preferred fluoropolymers are those that have a backbone that is at least 30% by weight fluorinated, preferably at least 50% by weight fluorinated, more preferably at least 65% by weight fluorinated. Examples of fluoropolymers for use in this disclosure include polymers of one or more fluorinated monomers optionally in combination with one or more non-fluorinated monomers. Examples of fluorinated monomers include fluorinated $C_2-C_8$ olefins that may have hydrogen and/or chlorine atoms such as tetrafluoroethylene (TFE), chlorotrifluoroethylene (CTFE), 2-chloropentafluoropropene, dichlorodifluoroethylene, vinyl fluoride, vinylidene fluoride (VDF) and fluorinated alkyl vinyl monomers such as hexafluoropropylene (HFP); fluorinated vinyl ethers, including perfluorinated vinyl ethers (PVE) and fluorinated allyl ethers including perfluorinated allyl ethers. Suitable non-fluorinated comonomers include vinyl chloride, vinylidene chloride and $C_2-C_8$ olefins such as ethylene (E) and propylene (P).

As used herein above and below the term "copolymer" means a polymer comprising repeating units derived from the recited monomers (comonomers) without excluding the option of other repeating units being present that derive from other monomers (comonomers) not explicitly recited.

Examples of perfluorinated vinyl ethers that can be used in the disclosure include those that correspond to the formula:

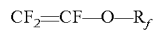

wherein $R_f$ represents a perfluorinated aliphatic group that may contain one or more oxygen atoms.

Particularly preferred perfluorinated vinyl ethers correspond to the formula:

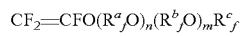

wherein $R^a_f$ and $R^b_f$ are different linear or branched perfluoroalkylene groups of 1-6 carbon atoms, in particular 2 to 6 carbon atoms, m and n are independently 0-10 and $R^c_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3$—$(CF_2)_2$—O—$CF(CF_3)$—$CF_2$—O—$CF(CF_3)$—$CF_2$—O—CF=$CF_2$.

Suitable fluoroalkyl vinyl monomers correspond to the general formula:

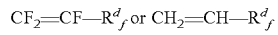

wherein $R^d_f$ represents a perfluoroalkyl group of 1 to 10, preferably 1 to 5 carbon atoms. A typical example of a fluoroalkyl vinyl monomer is hexafluoropropylene.

The fluoropolymers for use in connection with the present disclosure can be made in accordance with any of the known polymerization methods for making fluoropolymers. Such methods include without limitation, aqueous emulsion polymerization, suspension polymerization and polymerization in an organic solvent.

The fluoropolymer for use in connection with the present disclosure is a substantially amorphous polymer that shows hardly any melting point if at all. Such fluoropolymers are particularly suitable for providing fluoroelastomers, which are typically obtained upon curing of an amorphous fluoropolymer, also referred to as fluoroelastomer gum. In one embodiment, amorphous fluoropolymers include for example copolymers of vinylidene fluoride and at least one terminally ethylenically-unsaturated fluoromonomer containing at least one fluorine atom substituent on each double-bonded carbon atom, each carbon atom of the fluoromonomer being substituted only with fluorine and optionally with chlorine, hydrogen, a lower fluoroalkyl radical, or a lower fluoroalkoxy radical. In one embodiment, amorphous fluoropolymers include for example a perfluorinated or perhalogentated monomer and at least one partially fluorinated or nonfluorinated monomer. Specific examples of copolymers include for example copolymers having a combination of monomers as follows: VDF-HFP, TFE-P, VDF-TFE-HFP, VDF-PVE, VDF-TFE-PVE, VDF-TFE-P, TFE-PVE, E-TFE, E-TFE-PVE, and any of the aforementioned copolymers further including units derived from a chlorine containing monomer such as CTFE. Still further examples of suitable amorphous copolymers include copolymers having a combination of monomers such as in CTFE-P.

Preferred amorphous fluoropolymers generally comprise from 20 to 85%, preferably 50 to 80% by moles of repeating units derived from VDF, TFE, HFP, and/or CTFE, copolymerized with one or more other fluorinated ethylenically unsaturated monomer and/or one or more non fluorinated $C_2$-$C_8$ olefins, such as ethylene and propylene. The units derived from the fluorinated ethylenically unsaturated comonomer when present is generally between 5 and 45 mole %, preferably between 10 and 35 mole %. The amount of non-fluorinated comonomer when present is generally between 0 and 50 mole %, preferably between 1 and 30 mole %.

The fluoroelastomer composition will typically be cured. The fluoroelastomer composition will typically include a cure composition such that the fluoropolymer can be cured. The cure composition typically includes one or more components that cause the fluoropolymer chains to link with each other thereby forming a three dimensional network. Such components may include catalysts, curing agents and/or coagents.

In the present disclosure, a so called peroxide cure system may be used for curing the fluoroelastomer composition. In a typical peroxide cure system, the fluoropolymer is provided with one or more cure sites that comprise a halogen or nitrogen capable of participating in a peroxide cure reaction and an organic peroxide.

The halogen capable of participating in a peroxide cure reaction is typically bromine or iodine and may be distributed along the polymer chain and/or may be contained in the end groups of the fluoropolymer. Typically, the amount of bromine or iodine contained in the fluoropolymer is between 0.001 and 5%, preferably between 0.01 and 2.5%, by weight with respect to the total weight of the fluoropolymer. It has further been found that also chlorine is capable of participating in a peroxide cure reaction of the fluoropolymer if an organic compound comprising a hydride function MH, where M is selected from Si, Ge, Sn or Pb, is present. Accordingly, also fluoropolymers that contain chlorine atoms and/or bromine or iodine can be used for curing in a peroxide cure reaction. The amount of chlorine in the fluoropolymer may vary from 0.001% by weight to 10% by weight but is typically between 0.01% by weight and 5% by weight based on the weight of fluoropolymer. The fluoropolymer for use in the peroxide cure reaction typically will have a molecular weight of $10^4$ to $5 \times 10^5$ g/mol and the molecular weight distribution can be monomodal as well as bimodal or multimodal.

In order to introduce halogens, which are capable of participation in the peroxide cure reaction, along the chain, the copolymerization of the basic monomers of the fluoropolymer can be carried out with a suitable fluorinated cure-site monomer (see for instance U.S. Pat. Nos. 4,745,165, 4,831,085, and 4,214,060). Such comonomer can be selected for instance from:

(a) bromo- or iodo-(per)fluoroalkyl-(per)fluorovinylethers having the formula:

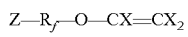

wherein each X may be the same or different and represents H or F, Z is Br or I, $R_f$ is a (per)fluoroalkylene $C_1$-$C_{12}$, optionally containing chlorine and/or ether oxygen atoms; for example: $BrCF_2$—O—CF=$CF_2$, $BrCF_2CF_2$—O—CF=$CF_2$, $BrCF_2CF_2CF_2$—O—CF=$CF_2$, $CF_3CFBrCF_2$—O—CF=$CF_2$, and the like;

(b) bromo- or iodo perfluoroolefins such as those having the formula:

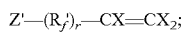

wherein each X independently represents H or F, Z' is Br or I, $R'_f$ is a perfluoroalkylene $C_1$-$C_{12}$, optionally containing chlorine atoms and r is 0 or 1; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1;

(c) non-fluorinated bromo-olefins such as vinyl bromide and 4-bromo-1-butene; and (d) chlorine containing monomers including chlorine containing fluorinated monomers such as for example chlorine containing fluorinated $C_2$-$C_8$ olefins such as CTFE and non-fluorinated chlorine containing monomers such as chlorinated $C_2$-$C_8$ olefins such as vinyl chloride and vinylidene chloride.

A nitrogen capable of participating in a peroxide cure reaction may also be used for curing a partially fluorinated elastomer as disclosed in U.S. Publ. No. 2011-0152487 (Cook et al.) herein incorporated by reference. The nitrogen capable of participating in a peroxide cure reactionis typically a nitrile group, which may be introduced, e.g., by use of a nitrile-containing cure site monomer.

Examples of monomers comprising nitrile-containing groups useful in preparing fluoropolymers comprising a nitrile-containing cure site include free-radically polymerizable The nitrile containing monomer may be selected from perfluorinated cure site monomers. Useful nitrile-containing cure site monomers include, for example, perfluoro(8-cyano-5-methyl-3,6-dioxa-1-octene); $CF_2$=$CFO(CF_2)_L CN$ wherein L is an integer from 2 to 12; $CF_2$=$CFO(CF_2)_u OCF(CF_3)CN$ wherein u is an integer from 2 to 6; $CF_2$=$CFO[CF_2CF(CF_3)O]_q(CF_2O)_y CF(CF_3)CN$ wherein q is an integer from 0 to 4 and y is an integer from 0 to 6; or $CF_2$=$CF[OCF_2CF(CF_3)]_r O(CF_2)_t CN$ wherein r is 1 or 2, and t is an integer from 1 to 4; and derivatives and combinations of the foregoing.

Exemplary nitrile containing monomer include: $CF_2$=$CFO(CF_2)_5 CN$, $CF_2$=$CFOCF_2CF(CF_3)OCF_2CF_2CN$, $CF_2$=$CFOCF_2CF(CF_3)OCF_2CF(CF_3)CN$, $CF_2$=$CFOCF_2CF_2CF_2OCF(CF_3)CN$, $CF_2$=$CFOCF_2CF(CF_3)OCF_2CF_2CN$; and combinations thereof.

The amount of nitrile-containing cure sites in a side chain position of the fluoroelastomer generally is from about 0.05 to about 5 mole percent or even from 0.1 to 2 mole percent relative to the total polymer.

In replacement of, or in addition to, the cure site comonomer, the fluoropolymer can contain a cure site component in terminal position, deriving from a suitable chain transfer agent introduced in the reaction medium during the polymer preparation, as described in U.S. Pat. No. 4,501,869 or derived from a suitable initiator. Examples of useful initiators include $X(CF_2)_n SO_2 Na$ with n=1 to 10 (where X is Br or I). Still further, the initiation and/or polymerization may be conducted in the presence of a halide salt such as a metal or ammonium halide including for example potassium chloride, sodium chloride, potassium bromide, ammonium bromide or chloride and potassium or sodium iodide to introduce a halide in a terminal position on the fluoropolymer.

Suitable chain transfer agents, are known in the art. An example of a chain transfer agent includes those having the formula $R_f Br_x$, wherein $R_f$ is a x-valent (per)fluoroalkyl radical $C_1$-$C_{12}$, optionally containing chlorine atoms, while x is 1 or 2. Examples include $CF_2Br_2$, $Br(CF_2)_2Br$, $Br(CF_2)_4Br$, $CF_2ClBr$, $CF_3CFBrCF_2Br$, and the like. Another example of a chain transfer agent includes those having the formula I—$(CX_2)_n$—I wherein X is F or H and n is 2, 3, 4, 5, 6, or 7. Examples include 1,2-diiodomethane, 1,4-diiodoperfluorobutane, and 1,6-diiodoperfluorohexane. Another example of a chain transfer agent includes those having the formula $Y(CF_2)_mCH_2CH_2I$, wherein m is an integer from 3-12 and Y if —F or —$CH_2CH_2I$ such as disclosed in U.S. Pat. No. 5,231,154. Further examples of suitable chain transfer agents are disclosed in U.S. Pat. No. 4,000,356, EP Pat. Nos. 407 937 and EP 101 930, and U.S. Pat. No. 4,243,770.

The fluoropolymers of the present disclosure are peroxide curable. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, αα'-bis(t-butylperoxy-diisopropylbenzene), and di[1,3-dimethyl-3-(t-butylperoxy)-butyl] carbonate. Generally, about 1-3 parts of peroxide per 100 parts of fluoropolymer is used.

Another component which is usually included in a cure composition based on an organic peroxide, is a coagent composed of a polyunsaturated compound which is capable of cooperating with the peroxide to provide a useful cure. These coagents can be added in an amount of 0.1 to 10 parts per hundred parts fluoropolymer, preferably between 2-5 parts per hundred parts fluoropolymer. Those skilled in the art are capable of selecting conventional coagents based on desired physical properties. Examples of useful coagents include triallyl cyanurate; triallyl isocyanurate; triallyl trimellitate; tri(methylallyl) isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene) cyanurate. Particularly useful is triallyl isocyanurate. Other useful coagents include the bis-olefins disclosed in EPA 0 661 304 A1, EPA 0 784 064 A1 and EPA 0 769 521 A1.

In one embodiment, a dual cure system may be used. For example, the peroxide cure system may be combined with a bisphenol cure and/or a triazine cure to provide the cured fluoroelastomer compositions of the present disclosure.

In one embodiment, in addition to the hydrotalcite compound, the fluoroelastomer composition may further contain acid acceptors as are commonly used in a fluoroelastomer. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, etc. Organic acceptors include epoxies, sodium stearate, and magnesium oxalate. The amount of acid acceptors in addition to the hydrotalcite compound will generally depend on the amount of hydrotalcite compound used and the nature of the acid acceptor used. Typically, the amount of acid acceptor used should be such as to not eliminate the advantage and improvements brought about by the hydrotalcite component of the composition. Generally, the amount of the acid acceptor will be less than the amount of hydrotalcite used and will typically be less than 20% by weight relative to the weight of hydrotalcite used.

In one embodiment, the fluoroelastomer composition is substantially free of (less than 0.05, 0.01, or 0.001% by weight relative to the amount of fluoroelastomer) or does not contain an acid acceptor such as ZnO, $Ca(OH)_2$, and/or MgO.

The fluoroelastomer composition may contain further additives, such as carbon black, stabilizers, plasticizers, lubricants, fillers, and processing aids typically utilized in fluoropolymer compounding, provided they have adequate stability for the intended service conditions.

The fluoroelastomer composition may be prepared by mixing a fluoropolymer, hydrotalcite, a cure composition and other additives in conventional rubber processing equipment. Such equipment includes rubber mills, internal mixers, such as Banbury mixers, and mixing extruders.

It is further possible to prepare a premix of the fluoroelastomer composition whereby the premix comprises the fluoropolymer and part of other components of the full composition, but not all of them. The composition of such a premix will depend on desired stability of the premix over a desired period of storage. For example, the premix may comprise the fluoropolymer, the hydrotalcite and one or more components of a cure composition but not all of the components necessary to obtain a curable composition. For example, in case the cure composition comprises peroxide, it will generally be desired to exclude the peroxide from the premix and only add the peroxide at the time of preparing the fluoroelastomer composition.

In accordance with the method of the present disclosure for making a component for contacting ammonia, a curable fluoroelastomer composition comprising a fluoropolymer preferably having one or more halogens capable of participating in a cure reaction, an organic peroxide and a hydrotalcite compound is cured and shaped to form a fluoroelastomer composition that in use will be in contact with ammonia and/or urea. Typically, the hydrotalcite compound will be present in the fluoroelastomer composition and the fluoroelastomer composition may also include a cure composition as described above.

Exemplary embodiments of the present disclosure include:

Embodiment 1. A component for contacting ammonia and/or urea having a surface that is in contact with at least one of urea and ammonia, the surface comprising a fluoroelastomer composition comprising a fluoropolymer and a hydrotalcite compound.

Embodiment 2. The component of embodiment 1, wherein the hydrotalcite compound comprises a synthetic hydrotalcite compound.

Embodiment 3. The component of any one of the previous embodiments, wherein the hydrotalcite compound corresponds to the formula:

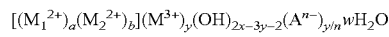

wherein $M_1^{2+}$ represents at least one divalent metal selected from the group consisting of Mg2+, Ca2+, Sr2+ and Ba2+; $M_2^{2+}$) represents at least one divalent metal selected from the group consisting of Zn2+, Cd2+, Pb2+ and Sn2+: $M^{3+}$ represents a trivalent metal ion; $A^{n-}$ represents an n-valent anion; a and b each independently represents a value from 0 to 10, x represents a+b and has a value from 1 to 10, y represents an integer from 1 to 5, and w represents a real number.

Embodiment 4. The component of embodiment 1, wherein the hydrotalcite compound is a natural hydrotacilte compound.

Embodiment 5. The component of any one of the previous embodiments, wherein the component is part of a reaction vessel or an exhaust system.

Embodiment 6. The component of any one of the previous embodiments, wherein the component is selected from at least one a molded good, a hose, or an O-ring.

Embodiment 7. The component of any one of the previous embodiments, wherein the fluoroelastomer composition comprises the cured product of a curable composition comprising (i) a fluoropolymer having a partially fluorinated backbone and having a halogen and/or nitrile capable of participating in a peroxide cure reaction and (ii) an organic peroxide.

Embodiment 8. The component of any one of the previous embodiments, wherein the fluoropolymer is a polymer derived from (i) hexafluoropropylene, tetrafluoroethylene, and vinylidene fluoride; (ii) hexafluoropropylene and vinylidene fluoride, (iii) vinylidene fluoride and perfluoromethyl vinyl ether, (iv) vinylidene fluoride, tetrafluoroethylene, and perfluoromethyl vinyl ether, (v) vinylidene fluoride, tetrafluoroethylene, and propylene, (vi) tetrafluoroethylene, and propylene, or (vii) ethylene, tetrafluoroethylene, and perfluoromethyl vinyl ether.

Embodiment 9. The component of any one of the previous embodiments, wherein the hydrotalcite compound is present in an amount of 0.1 to 20% by weight based on the fluoropolymer.

Embodiment 10. A method comprising utilizing a hydrotalcite compound in a fluoroelastomer composition of a component for contacting ammonia and/or urea to prevent or reduce swelling of the fluoroelastomer composition when the fluoroelastomer composition is contacted with at least one of urea and ammonia.

Embodiment 11. The method of embodiment 10, wherein the hydrotalcite compound corresponds to the formula:

$$[(M_1^{2+})_a(M_2^{2+})_b](M^{3+})_y(OH)_{2x+3y-2}(A^{n-})_{y/n}wH_2O$$

wherein $M_1^{2+}$ represents at least one divalent metal selected from the group consisting of Mg2+, Ca2+, Sr2+ and Ba2+; $M_2^{2+}$) represents at least one divalent metal selected from the group consisting of Zn2+, Cd2+, Pb2+ and Sn2+; $M^{3+}$ represents a trivalent metal ion; $A^{n-}$ represents an n-valent anion; a and b each independently represents a value from 0 to 10, x represents a+b and has a value from 1 to 10, y represents an integer from 1 to 5, and w represents a real number.

Embodiment 12. The method of any one of embodiments 10-11, wherein the component is part of a reaction vessel or an exhaust system.

Embodiment 13. The method of any one of embodiments 10-12, wherein the component is a molded good, a hose, or an O-ring.

Embodiment 14. The method of any one of embodiments 10-13, wherein the fluoroelastomer composition comprises the cured product of a curable composition comprising (i) a fluoropolymer having a partially fluorinated backbone and having a halogen and/or a nitrogen capable of participating in a peroxide cure reaction and (ii) an organic peroxide.

Embodiment 15. The method of any one of embodiments 10-14, wherein the fluoroelastomer composition comprises a polymer derived from (i) hexafluoropropylene, tetrafluoroethylene, and vinylidene fluoride; (ii) hexafluoropropylene and vinylidene fluoride, (iii) vinylidene fluoride and perfluoromethyl vinyl ether, (iv) vinylidene fluoride, tetrafluoroethylene, and perfluoromethyl vinyl ether, (v) vinylidene fluoride, tetrafluoroethylene, and propylene, (vi) tetrafluoroethylene, and propylene, or (vii) ethylene, tetrafluoroethylene, and perfluoromethyl vinyl ether.

Embodiment 16. Use of a hydrotalcite compound in a fluoroelastomer composition of a component for contacting ammonia and/or urea to prevent or reduce swelling of the fluoroelastomer composition when the fluoroelastomer composition is contacted with at least one of urea and ammonia.

Embodiment 17. Use according to embodiment 16 wherein the hydrotalcite compound is present in an amount of 0.1 to 20% by weight based on the fluoropolymer in the fluoroelastomer composition.

Embodiment 18. Use according to any one of embodiments 16-17, wherein the hydrotalcite compound corresponds to the formula:

$$[(M_1^{2+})_a(M_2^{2+})_b](M^{3+})_y(OH)_{2x+3y-2}(A^{n-})_{y/n}wH_2O$$

wherein $M_1^{2+}$ represents at least one divalent metal selected from the group consisting of Mg2+, Ca2+, Sr2+ and Ba2+; $M_2^{2+}$) represents at least one divalent metal selected from the group consisting of Zn2+, Cd2+, Pb2+ and Sn2+; $M^{3+}$ represents a trivalent metal ion; $A^{n-}$ represents an n-valent anion; a and b each independently represents a value from 0 to 10, x represents a+b and has a value from 1 to 10, y represents an integer from 1 to 5, and w represents a real number.

Embodiment 19. Use according to any one of embodiments 16-18, wherein the fluoroelastomer composition comprises the cured product of a curable composition comprising (i) a fluoropolymer having a partially fluorinated backbone and having a halogen and/or nitrile capable of participating in a peroxide cure reaction and (ii) an organic peroxide.

Embodiment 20. Use according to any one of embodiment s 16-19, wherein the fluoroelastomer composition is a fluoropolymer derived from (i) hexafluoropropylene, tetrafluoroethylene, and vinylidene fluoride; (ii) hexafluoropropylene and vinylidene fluoride, (iii) vinylidene fluoride and perfluoromethyl vinyl ether, (iv) vinylidene fluoride, tetrafluoroethylene, and perfluoromethyl vinyl ether, (v) vinylidene fluoride, tetrafluoroethylene, and propylene, (vi) tetrafluoroethylene, and propylene, or (vii) ethylene, tetrafluoroethylene, and perfluoromethyl vinyl ether.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials were obtained or are available, from general chemical suppliers such as, for example, Sigma-Aldrich Company, Saint Louis, Mo., or may be synthesized by conventional methods unless otherwise stated.

Materials

| | |
|---|---|
| Urea Solution | "ADBLUE", trade designation of the German Association of the Automotive Industry. A diesel exhaust fluid (DEF) standardized as ISO 22241 as an aqueous urea solution made with 32.5% high-purity urea (AUS 32) and 67.5% deionized water. |

| | |
|---|---|
| Ammonia Solution | 10% by weight ammonia |
| Ca(OH)$_2$ | calcium hydroxide, Rhenofit CF, Rhein Chemie. |
| ZnO | zinc oxide, Bayer, Leverkusen, Germany |
| MgO | Commercially available under the trade designation "MAGLITE Y", Dead Sea Periclase, Israel |
| Carbon black | MT Carbon Black, commercially available from Cancarb, Alberta, CA. |
| Peroxide | Organic peroxide commercially available from Akzo, Amsterdam, the Netherlands under the trade designation "TRIGONOX 101 50D". |
| Coagent | TAIC (70%), triallyl-isocyanurate, 70% on silicate carrier commercially available from Lehmann & Voss, Hamburg, Germany |
| FE-1 | A peroxide curable fluoroelastomer gum commercially available from 3M Company, St. Paul, MN under the trade designation "FPO 3730" a terpolymer of tetrafluoroethylene, hexafluoropropylene and vinylidenefluoride.. |
| FE-2 | A bisphenol curable fluoroelastomer gum commercially available from 3M, St. Paul, MN under the trade designation "FE 5830Z", an incorporated cure gum that is a terpolymer of tetrafluoroethylene, hexafluoropropylene and vinylidenefluoride. |
| Hydrotalcite | Commercially available from Kisuma Chemicals BV, Amsterdam, the Netherlands under the trade designation "DHT-4V" and corresponding to the formula $Mg_{4.5}Al_2(OH)_{13}CO_3 \cdot 3.5H_2O$. |

Test Methods

Physical property testing was obtained after 150 mm (millimeter)×150 mm×2 mm sheets of fluoroelastomer gum were pressed and allowed to vulcanize followed by post-curing treatment by heating the sheets in a circulating air oven according to following temperature conditions:

| | CEA | CEB | EX1 | CEC |
|---|---|---|---|---|
| Press Cure | 6 min@177° C. | 6 min@177° C. | 15 min@180° C. | 7 min@177° C. |
| Post Cure | 16 hrs@230° C. | 16 hrs@230° C. | 2 hrs@180° C. | 16 hrs@230° C. |

Volume Swell (ASTM D471-95) was measured from S2 dumbbells cut out of the cured 2 mm sheet and aged in a sealed PARR vessel for the required time and temperature as indicated in the tables. After this the PARR vessel was allowed to cool down until the pressure was low enough to open. Then the S2 dumbells were placed in cold fresh test fluid for 30 min (minutes), rinsed, dried, weighed and calculations done for % swell as per ASTM D471-95. Tensile Strength at Break, Elongation at Break and Stress at 100% Elongation were then determined on the same dumbbells using an INSTRON mechanical tester with a 1 kN load cell in accordance with DIN 53504-1985 (S2 die). All tests were run at a constant cross head displacement rate of 200 mm/min in threefold. The values reported were averages of the three tests. Hardness Shore A (2"), Stress at 100% Elongation, Elongation at Break, and Tensile Strength at Break were reported in units of MegaPascals (MPa), %, and MPa respectively.

Comparative Examples CEA-CEC and Example 1 (EX1)

Curable compositions were made on a 2 roll mill by mixing the components as per Table 1. The amounts are presented as parts per hundred rubber or fluoroelastomer (phr) as is customary in the rubber industry.

TABLE 1

| | CEA | CEB | EX1 | CEC |
|---|---|---|---|---|
| FE1 | 100 | 100 | 100 | 0 |
| FE2 | 0 | 0 | 0 | 100 |

TABLE 1-continued

| | CEA | CEB | EX1 | CEC |
|---|---|---|---|---|
| Hydrotalcite | 0 | 0 | 1 | 0 |
| ZnO | 3 | 0 | 0 | 0 |

TABLE 1-continued

| | CEA | CEB | EX1 | CEC |
|---|---|---|---|---|
| Ca(OH)$_2$ | 0 | 0 | 0 | 3 |
| MgO | 0 | 0 | 0 | 6 |
| Peroxide | 3 | 3 | 3 | 0 |
| Coagent | 2.85 | 2.85 | 2.85 | 0 |
| Carbon black | 30 | 30 | 30 | 30 |

CEA-CEC and Example 1 were tested for swell and physical properties changes after soaking in either the Urea Solution or the Ammonia Solution at various temperatures and lengths of time. The results are shown in Tables 2-5.

TABLE 2

Swell and Physical Property Changes after Exposure to Swell Testing for 168 hrs (hours) at 100° C. in the Urea Solution

| | CEA | CEB | EX1 | CEC |
|---|---|---|---|---|
| Shore Hardness A | −13 | −22 | −8 | −40 |
| 100% Modulus | NA | NA | 27 | NP |
| Tensile Strength % | −84 | −82 | −51 | NP |
| Elongation at break % | −75 | −71 | −48 | NP |
| Swell % | 141 | 186 | 64 | 346 |

NA = not available;
Elongation <100%
NP = Not possible to perform tensile test

TABLE 3

Swell and Physical Property Changes after Exposure to Swell Testing for 504 hrs at 80° C. in the Urea Solution

|  | CEA | CEB | EX1 |
| --- | --- | --- | --- |
| Shore Hardness A | −12 | −11 | −2 |
| 100% Modulus | −18 | −9 | −5 |
| Tensile Strength % | −39 | −27 | −8 |
| Elongation at break % | −5 | +22 | −4 |
| Swell % | 31 | 20 | 3 |

TABLE 4

Swell and Physical Property Changes after Exposure to Swell Testing for 168 hrs at 80° C. in Ammonia Solution

|  | CEA | CEB | EX1 | CEC |
| --- | --- | --- | --- | --- |
| Shore Hardness A | −14 | −13 | −15 | −47 |
| 100% Modulus | NA | NA | 32 | NA |
| Tensile Strength % | −68 | −65 | −47 | −83 |
| Elongation at break % | −62 | −63 | −47 | −83 |
| Swell % | 129 | 137 | 51 | 319 |

NA = not available;
Elongation <100%

TABLE 5

Swell and Physical Property Changes after Exposure to Swell Testing for 70 hrs at 100° C. in a Ammonia Solution

|  | CEA | CEB | EX1 | CEC |
| --- | --- | --- | --- | --- |
| Shore Hardness A | −13 | −14 | −8 | Broken |
| 100% Modulus | NA | NA | 29 | Broken |
| Tensile Strength % | −83 | −86 | −45 | Broken |
| Elongation at break % | −85 | −85 | −46 | Broken |
| Swell % | 191 | 246 | 76 | 755 |

NA = not available;
elongation <100%

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A component for contacting ammonia and/or urea having a surface that is in contact with at least one of urea and ammonia, the surface comprising a fluoroelastomer composition comprising a fluoropolymer and a hydrotalcite compound, wherein the component is part of an exhaust system and wherein the fluoropolymer comprises 50 to 80% by moles of repeating units derived from vinylidene fluoride, tetrafluoroethylene, and hexafluoropropylene.

2. The component of claim 1, wherein the hydrotalcite compound comprises a synthetic hydrotalcite compound.

3. The component of claim 1, wherein the hydrotalcite compound corresponds to the formula:

$$[(M_1^{2+})_a(M_2^{2+})_b](M^{3+})_y(OH)_{2x+3y-2}(A^{n-})_{y/n} \cdot wH_2O$$

wherein $M_1^{2+}$ represents at least one divalent metal selected from the group consisting of Mg2+, Ca2+, Sr2+ and Ba2+; $M^{2+}$ represents at least one divalent metal selected from the group consisting of Zn2+, Cd2+, Pb2+ and Sn2+; $M^{3+}$ represents a trivalent metal ion; $A^{n-}$ represents an n− valent anion; a and b each independently represents a value from 0 to 10, x represents a+b and has a value from 1 to 10, y represents an integer from 1 to 5, and w represents a real number.

4. The component of claim 1, wherein the hydrotalcite compound is present in an amount of 0.1 to 20% by weight based on the fluoropolymer.

5. The component of claim 1, wherein the hydrotalcite compound is a natural hydrotalcite compound.

6. The component of claim 1, wherein the fluoroelastomer composition comprises the cured product of a curable composition comprising (i) a fluoropolymer having a partially fluorinated backbone and having a halogen and/or nitrile capable of participating in a peroxide cure reaction and (ii) an organic peroxide.

7. A method comprising utilizing a hydrotalcite compound in a fluoroelastomer composition of a component for contacting ammonia and/or urea to prevent or reduce swelling of the fluoroelastomer composition when the fluoroelastomer composition is contacted with at least one of urea and ammonia, wherein the component is part of an exhaust system and wherein a fluoropolymer of the fluoroelastomer composition comprises 50 to 80% by moles of repeating units derived from vinylidene fluoride, tetrafluoroethylene, and hexafluoropropylene.

8. The component of claim 1, wherein the component is selected from at least one of a molded good, a hose, or an O-ring.

9. The method of claim 7, wherein the hydrotalcite compound corresponds to the formula:

$$[(M_1^{2+})_a(M_2^{2+})_b](M^{3+})_y(OH)_{2x+3y-2}(A^{n-})_{y/n} \cdot wH_2O$$

wherein $M_1^{2+}$ represents at least one divalent metal selected from the group consisting of Mg2+, Ca2+, Sr2+ and Ba2+; $M_2^{2+}$ represents at least one divalent metal selected from the group consisting of Zn2+, Cd2+, Pb2+ and Sn2+; $M^{3+}$ represents a trivalent metal ion; $A^{n-}$ represents an n− valent anion; a and b each independently represents a value from 0 to 10, x represents a+b and has a value from 1 to 10, y represents an integer from 1 to 5, and w represents a real number.

10. The method of claim 7, wherein the component is a molded good, a hose, or an O-ring.

11. The method of claim 7, wherein the fluoroelastomer composition comprises the cured product of a curable composition comprising (i) a fluoropolymer having a partially fluorinated backbone and having a halogen and/or a nitrogen capable of participating in a peroxide cure reaction and (ii) an organic peroxide.

12. The method of claim 7, wherein the hydrotalcite compound is present in an amount of 0.1 to 20% by weight based on the fluoropolymer in the fluoroelastomer composition.

13. The component of claim 1, wherein the surface is in contact with a solution comprising at least 10% by weight of at least one of urea and ammonia.

14. The method of claim 7, wherein the fluoroelastomer composition is in contact with a solution comprising at least 10% by weight of at least one of urea and ammonia.

15. The component of claim 1, wherein the fluoropolymer comprises at least one of bromine and iodine.

16. The component of claim 1, wherein the component has improved swell resistance to ammonia and/or urea as compared to the same fluoroelastomer not comprising the hydrotalcite compound.

17. The component of claim 1, wherein the fluoropolymer is further derived from fluorinated ethylenically unsaturated monomers.

18. The component of claim 17, wherein the fluorinated ethylenically unsaturated monomers are selected from at least one of vinyl fluoride, perfluorinated vinyl ethers, and perfluorinated allyl ethers.

19. The method of claim 7, wherein the fluoropolymer is further derived from fluorinated ethylenically unsaturated monomers.

20. The method of claim 19, wherein the fluorinated ethylenically unsaturated monomers are selected from at least one of vinyl fluoride, perfluorinated vinyl ethers, and perfluorinated allyl ethers.

\* \* \* \* \*

UNITED STATES PATENT AND TRADEMARK OFFICE
CERTIFICATE OF CORRECTION

PATENT NO.         : 10,294,344 B2
APPLICATION NO.    : 15/036823
DATED              : May 21, 2019
INVENTOR(S)        : Alain Verschuere Page 1 of 1

It is certified that error appears in the above-identified patent and that said Letters Patent is hereby corrected as shown below:

In the Specification

Column 3,
Line 6, delete "$Mg_6Al_2(OH)_{16}CO_3.4H_2)$" and insert -- $Mg_6Al_2(OH)_{16}CO_3.4H_2O$ --, therefor.
Line 28, delete "$Mg^{2|}$, $Ca^{2|}$," and insert -- $Mg^{2+}$, $Ca^{2+}$, --, therefor.
Line 29, delete "$M2^{2+}$" and insert -- $M_2^{2+}$ --, therefor.

Column 6,
Line 25, after "polymerizable" insert -- nitriles. --.

Column 7,
Line 20, delete "αα'-" and insert -- α,α'- --, therefor.

Column 8,
Line 51, delete "$[(M_1^{2+})_a(M_2^{2+})_b](M^{3+})_y(OH)_{2x-3y-2}(A^{n-})_{y/n}wH_2O$" and insert
-- $[(M_1^{2+})_a(M_2^{2+})_b](M^{3+})_y(OH)_{2x+3y-2}(A^{n-})_{y/n}wH_2O$ --, therefor.
Line 56, delete "$Sn2+: M^{3|}$" and insert -- $Sn2+; M^{3+}$ --, therefor.

In the Claims

Column 13,
Line 64, in Claim 3, delete "$M^{2+}$" and insert -- $M_2^{2+}$ --, therefor.

Signed and Sealed this
Twentieth Day of August, 2019

Andrei Iancu
*Director of the United States Patent and Trademark Office*